United States Patent
Oishi

(10) Patent No.: US 9,493,106 B2
(45) Date of Patent: Nov. 15, 2016

(54) IMAGE DISPLAYING SPEEDOMETER

(71) Applicant: Yazaki Corporation, Minato-ku, Tokyo (JP)

(72) Inventor: Yukio Oishi, Shimada (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 206 days.

(21) Appl. No.: 14/198,734

(22) Filed: Mar. 6, 2014

(65) Prior Publication Data
US 2014/0300459 A1   Oct. 9, 2014

Related U.S. Application Data

(63) Continuation of application No. PCT/JP2012/073386, filed on Sep. 6, 2012.

(30) Foreign Application Priority Data

Sep. 6, 2011   (JP) .................................. 2011-194255

(51) Int. Cl.
  *B60Q 1/00*   (2006.01)
  *B60Q 1/54*   (2006.01)
  (Continued)

(52) U.S. Cl.
  CPC .............. *B60Q 1/00* (2013.01); *B60K 31/0008* (2013.01); *B60K 31/185* (2013.01); *B60Q 1/54* (2013.01);
  (Continued)

(58) Field of Classification Search
  CPC ...... B60Q 1/00; B60Q 1/54; B60K 31/0008; B60K 31/185; G01P 1/10; G01P 1/103
  USPC ............ 340/936, 441, 461, 462; 701/93, 96; 180/170
  See application file for complete search history.

(56) References Cited

U.S. PATENT DOCUMENTS 6,226,588 B1 * 5/2001 Teramura ........... B60K 31/0008
                                                  123/319
6,324,463 B1 * 11/2001 Patel .................... B60K 31/185
                                                  180/170
(Continued)

FOREIGN PATENT DOCUMENTS

CN   101371107 A   2/2009
DE   19737679 A1   3/1999
(Continued)

OTHER PUBLICATIONS

International Search Report and Written Opinion issued in corresponding International Application No. PCT/JP2012/073386 mailed May 23, 2013.

(Continued)

*Primary Examiner* — John A Tweel, Jr.
(74) *Attorney, Agent, or Firm* — Banner & Witcoff, Ltd.

(57) ABSTRACT

An image displaying speedometer includes an input section configured to receive a movement input and a decision input among various inputs, and a display section that output information. The display section outputs a speed scale and either one of a first index which indicates a part of the speed scale and a second index which indicates a part of the speed scale as information, the first index being different from the second index. The display section outputs the first index so as to indicate the part of the speed scale in accordance with the movement input received by the input section, and outputs the second index, instead of the first index, so as to indicate the part of the speed scale which has been indicated by the first index after the input section receives the decision input.

6 Claims, 5 Drawing Sheets

(51) Int. Cl.
- *G01P 1/10* (2006.01)
- *B60K 31/00* (2006.01)
- *B60K 31/18* (2006.01)
- *G01P 1/08* (2006.01)
- *G01D 7/04* (2006.01)

(52) U.S. Cl.
CPC . *G01D 7/04* (2013.01); *G01P 1/08* (2013.01); *G01P 1/10* (2013.01); *G01P 1/103* (2013.01); *B60K 2310/20* (2013.01); *B60K 2310/22* (2013.01); *B60K 2310/242* (2013.01); *B60K 2350/1004* (2013.01); *B60K 2350/1064* (2013.01); *B60K 2350/1072* (2013.01)

(56) References Cited

U.S. PATENT DOCUMENTS

| | | | |
|---|---|---|---|
| 6,522,969 B2 * | 2/2003 | Kannonji | G08G 1/161 340/435 |
| 6,637,534 B2 * | 10/2003 | Barbehoen | B60K 31/185 180/170 |
| 6,693,523 B1 * | 2/2004 | Abel | B60K 37/02 340/441 |
| 7,178,819 B2 | 2/2007 | Scherl et al. | |
| 7,784,422 B2 | 8/2010 | Repetto et al. | |
| 2002/0036109 A1 | 3/2002 | Barbehoen et al. | |
| 2005/0006165 A1 | 1/2005 | Scherl et al. | |
| 2005/0168330 A1 * | 8/2005 | Ono | B60K 35/00 340/461 |
| 2008/0289564 A1 | 11/2008 | Repetto et al. | |
| 2014/0300459 A1 | 10/2014 | Oishi | |

FOREIGN PATENT DOCUMENTS

| | | |
|---|---|---|
| EP | 1151889 A2 | 11/2001 |
| EP | 1182077 A1 | 2/2002 |
| FR | 2931108 A1 | 11/2009 |
| JP | H04-102059 U | 9/1992 |
| JP | H11-245686 A | 9/1999 |
| JP | 2000-118263 A | 4/2000 |
| JP | 2002-316551 A | 10/2002 |
| JP | 2005-504677 A | 2/2005 |
| JP | 2006-256445 A | 9/2006 |
| JP | 2007-302028 A | 11/2007 |
| WO | 2008-082403 A1 | 7/2008 |
| WO | 2013-035887 A2 | 3/2013 |

OTHER PUBLICATIONS

Sep. 27, 2015—(CN) First Office Action—App 201280042845.6.
Dec. 7, 2015—(JP) Notification of Reasons for Refusal—App 2011-194255.
Aug. 11, 2015—(JP) Notification of Reasons for Refusal—App 2011-194255.

* cited by examiner

IMAGE DISPLAYING SPEEDOMETER

CROSS REFERENCE TO RELATED APPLICATIONS

This application is a continuation of PCT application No. PCT/JP2012/073386, which was filed on Sep. 6, 2012 based on Japanese Patent Application (No. 2011-194255) filed on Sep. 6, 2011, the contents of which are incorporated herein by reference.

BACKGROUND OF THE INVENTION

1. Field of the Invention

The invention relates to an image displaying speedometer.

2. Description of the Related Art

Recently, there are vehicles that have an automatic cruise control function to automatically control the vehicle to travel at a predetermined target speed. As such kind of in-vehicle speed displaying device, a speed displaying device, which can display a set target speed or a set target speed on a speed scale, is proposed (refer to a JP-A-2006-256445).

SUMMARY OF THE INVENTION

FIG. 5 shows a display example with the speed displaying device disclosed in JP-A-2006-256445. A target speed of the automatic cruise control which has been set last time is assigned to a code C2. A target speed of the automatic cruise control which is being set is assigned to a code C4. The target speeds shown with C2 and C4 are displayed on a speed scale. The target speed shown with C2 indicates approximately 15 km/h, and the target speed shown with C4 indicates approximately 17 km/h.

With the speed displaying device disclosed in JP-A-2006-256445, in the case of setting the target speed, as shown with arrows in FIG. 5, the display position of C4 moves according to the input operation of a driver. During this period, C2 is always displayed on the speed scale, and the target speed set last time is shown. When the target speed is set, C4 is deleted. At the same time, C2 is displayed at a display position indicating the newly set target speed.

In the case of setting the target speed, the display changes as described above. In the speed displaying device disclosed in JP-A-2006-256445, C2 and C4 are always displayed during the setting of the target speed, and there are many kinds of information. As a result, the burden required for a driver to recognize the information becomes excessive.

The invention is made in view of the previously described problem, and the object of the invention is to provide an image displaying speedometer which can reduce the burden required for a driver to recognize information in the case of setting a target speed.

The image displaying speedometer of the present disclosure is characterized by the following (1) to (4) to achieve the previously described object.

(1) There is provided an image displaying speedometer comprising:

an input section configured to receive a movement input and a decision input among various inputs; and a display section that output information, wherein the display section outputs a speed scale and either one of a first index which indicates a part of the speed scale and a second index which indicates a part of the speed scale as information, the first index being different from the second index; and wherein the display section outputs the first index so as to indicate the part of the speed scale in accordance with the movement input received by the input section, and outputs the second index, instead of the first index, so as to indicate the part of the speed scale which has been indicated by the first index after the input section receives the decision input.

(2) For example, the display region where the display section outputs the first index before the input section receives the decision input is different from the display region where the display section outputs the second index after the input section receives the decision input.

(3) For example, the display region where the display section outputs the first index before the input section receives the decision input is larger than the display region where the display section outputs the second index after the input section receives the decision input.

(4) For example, the display section corresponds speed information to the display region where the first index is output, and outputs the speed information as numerical information, according to the movement input received by the input section.

In the image displaying speedometer of the configuration of the above (1), the information displayed during the setting of the target speed is limited to one kind.

In the image displaying speedometer of the configuration of the above (2), the first index and the second index are distinguishably displayed.

In the image displaying speedometer of the configuration of the above (3), the first index is displayed by being emphasized over the second index.

In the image displaying speedometer of the configuration of the above (4), the speed information that is displayed by the first index is displayed to be understood easily.

According to the image displaying speedometer of the present disclosure, an image displaying speedometer which can reduce the burden required in the case of setting a target speed for a driver who performs the setting to recognize information can be provided.

The present disclosure has been briefly described above. Further, details of the invention will become more apparent after embodiments of the invention described below (hereinafter referred to as "embodiments") are read with reference to the accompanying figures.

DETAILED DESCRIPTION OF THE EXEMPLARY EMBODIMENTS

A specific embodiment of the image displaying speedometer of the present disclosure is described below with reference to the figures.

An image displaying speedometer 100 of the present embodiment is used by being carried in a vehicle such as an automobile.

Various devices for performing switches between a normal traveling in which a driver adjusts an accelerating quantity and an automatic cruise control traveling in which an automatic cruise is performed so that the vehicle travels at a predetermined target speed are carried in the vehicle. The switch between the normal traveling and the automatic cruise control traveling is performed with an operation of the driver. The target speed which is a reference speed of the control during the automatic cruise control traveling is determined with an operation of the driver. Next, the image displaying speedometer 100 of the present embodiment which serve as a user interface in the process of setting the target speed for the automatic cruise control traveling is described in detail.

Figure 1:
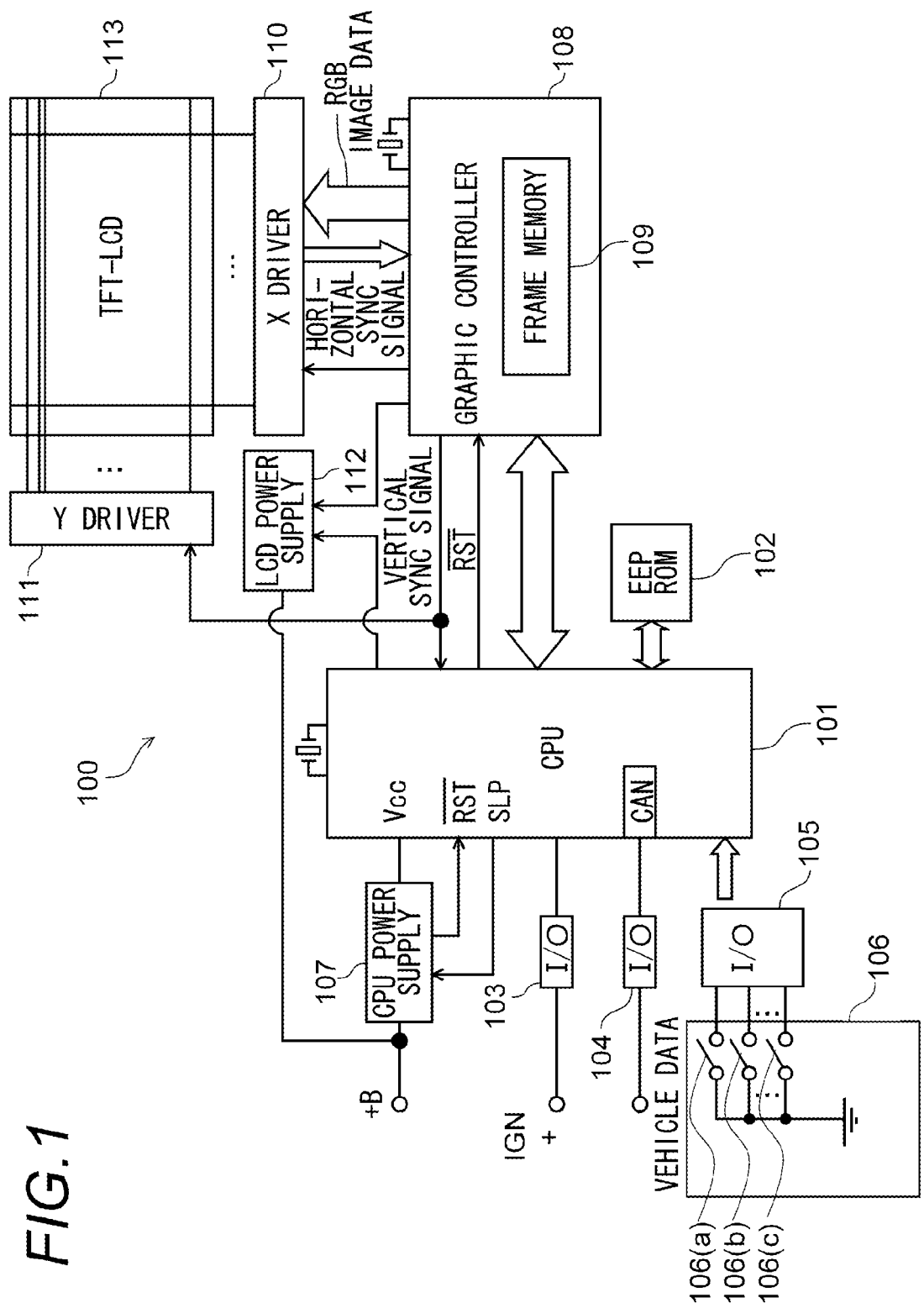
FIG. 1 is a block diagram which illustrates a hardware configuration example of the image displaying speedometer of an embodiment.

FIG. 1 illustrates a hardware configuration example of the image displaying speedometer 100 of the present embodiment.

As shown in FIG. 1, the image displaying speedometer 100 includes a microcomputer (CPU: Central Processing Unit) 101, a read only memory (EEPROM: Electrically Erasable Programmable Read Only Memory) 102, an interface 103, an interface 104, an interface 105, an operating section 106, a CPU power supply 107, a graphic controller 108, a frame memory 109, an X driver 110, a Y driver 111, an LCD (Liquid Crystal Display) power supply 112 and a liquid crystal display (TFT-LCD: Thin Film Transistor Liquid Crystal Display) 113.

The microcomputer 101 executes programs prepared beforehand and performs various processes necessary to implement functions of the image displaying speedometer 100. For example, the microcomputer 101 performs the processes shown in the flow charts of FIGS. 2 and 3 to be described below.

The read only memory 102 stores the contents of the programs that the microcomputer 101 executes, fixed data prepared beforehand or the like.

The interface 103 inputs a signal (IGN+) indicating the state of an ignition switch at the vehicle side into the microcomputer 101.

The interface 104 is used to perform communication between the microcomputer 101 and various control units (ECU: Electric Control Unit) at the vehicle side. In particular, data indicating various current vehicle states, such as vehicle speed, engine rotational speed, fuel residual quantity, cooling water temperature, and clutch connection or disconnection, are input into the microcomputer 101 from the vehicle side as approximately real-time data.

The interface 105 inputs signals received from the operating section 106 into the microcomputer 101. The operating section 106 includes various kinds of switches for receiving input operations from a driver. In the embodiment, the operating section 106 includes a deciding switch 106(a), a plus switch 106(b) and a minus switch 106(c).

The CPU power supply 107 generates a DC voltage (Vcc) that is necessary for actions of the microcomputer 101 by being input a direct current electric power supplied from a plus side power line (+B) at the vehicle side. Further, the CPU power supply 107 generates a reset signal as needed, and performs an action of inhibiting power supply according to a sleep signal output from the microcomputer 101.

The liquid crystal display 113 has a colored two dimension display screen in which a large number of display microcells, which are formed by a liquid crystal device, are arranged in parallel in the X direction and the Y direction. By individually controlling the display state of each of the large number of display microcells, desired information such as figures, texts and images can be graphically displayed on the two dimension display screen.

Figure 4A:
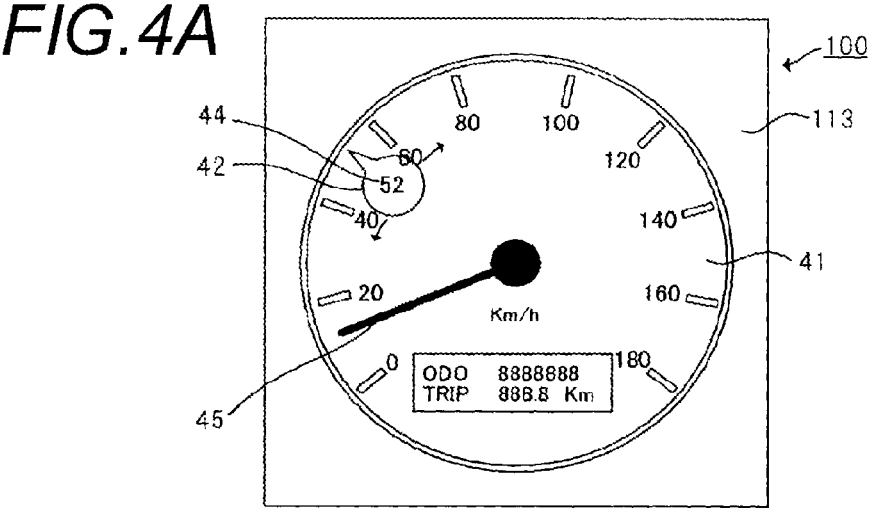
FIGS. 4A, 4B and 4C are figures which illustrate the display contents of a liquid crystal display with the processes when the target speed of the automatic cruise control traveling is set.
Figure 4B:
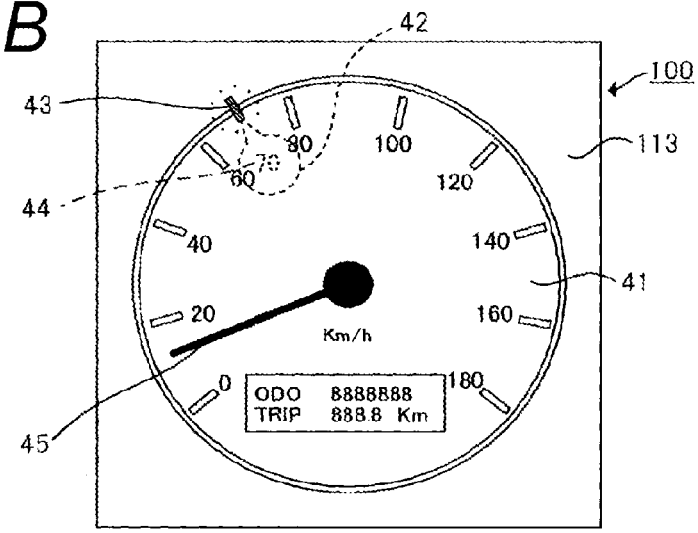
Figure 4C:
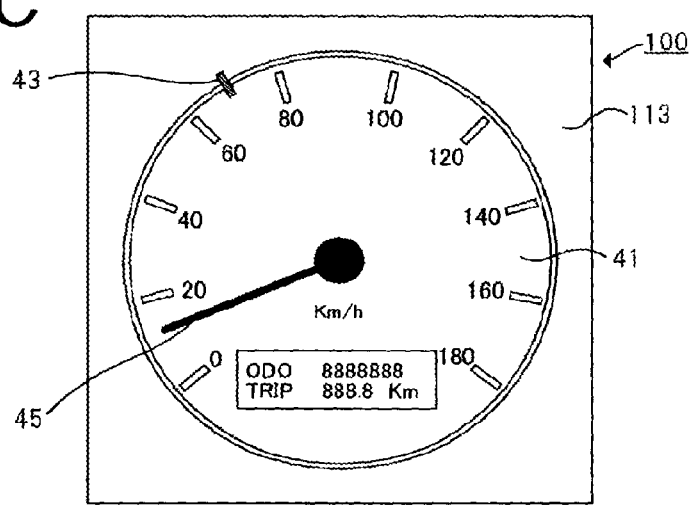
Figure 5:
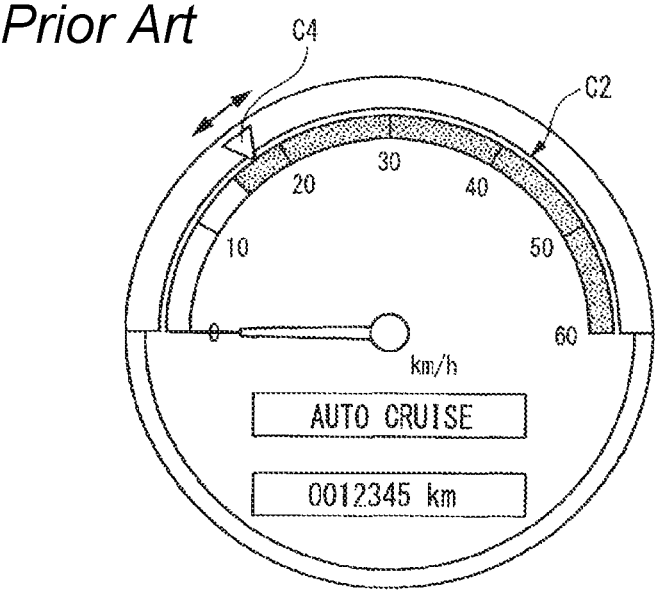
FIG. 5 is a figure which illustrates a display example of a conventional speed displaying device.

The liquid crystal display 113 displays graphic display screens as shown in FIGS. 4A, 4B and 4C with two dimension screen display. In the graphic display screens, a speed scale 41, a speed position mark (first index) 42, an automatic cruise mark (second index) 43, a numeric display 44 and a pointer 45 are displayed. The speed position mark 42 is a mark that indicates some speed information in the speed scale 41. The automatic cruise mark 43 is a mark that indicates some speed information in the speed scale 41. The numeric display 44 is a numerical value displayed inside the speed position mark 42, and displays the speed information that the speed position mark 42 indicates as digital information. The pointer 45 shows current vehicle speed by pointing to a part in the speed scale 41.

Scanning positions of the Y direction of the display screen of the liquid crystal display 113 are sequentially switched by the output of the Y driver 111. The Y driver 111 sequentially switches the scanning positions of the Y direction in sync with a vertical sync signal output from the graphic controller 108.

The X driver 110 sequentially switches the scanning positions of the X direction of the display screen of the liquid crystal display 113 in sync with a horizontal sync signal output from the graphic controller 108. The X driver 110 controls the display contents in the screen by giving image data of RGB colors output from the graphic controller 108 to display cells of the scanning positions.

The graphic controller 108 displays various graphic elements on the screen of the liquid crystal display 113 according to various instructions input from the microcomputer 101. In fact, the microcomputer 101 or the graphic controller 108 writes display data into the frame memory 109 that holds the display contents for each of the pixels, and performs graphic drawing. The vertical sync signal and the horizontal sync signal for scanning the screen of liquid crystal display 113 in two dimensions are produced, and display data stored in corresponding addresses in the frame memory 109 are given to the liquid crystal display 113 at timings in sync with these sync signals.

The LCD power supply 112 generates predetermined direct current electric power that is necessary for the display of the liquid crystal display 113 by being input direct current electric power supplied from a plus side power line (+B) at the vehicle side.

Next, detailed actions of the image displaying speedometer 100 are described.

Figure 2:
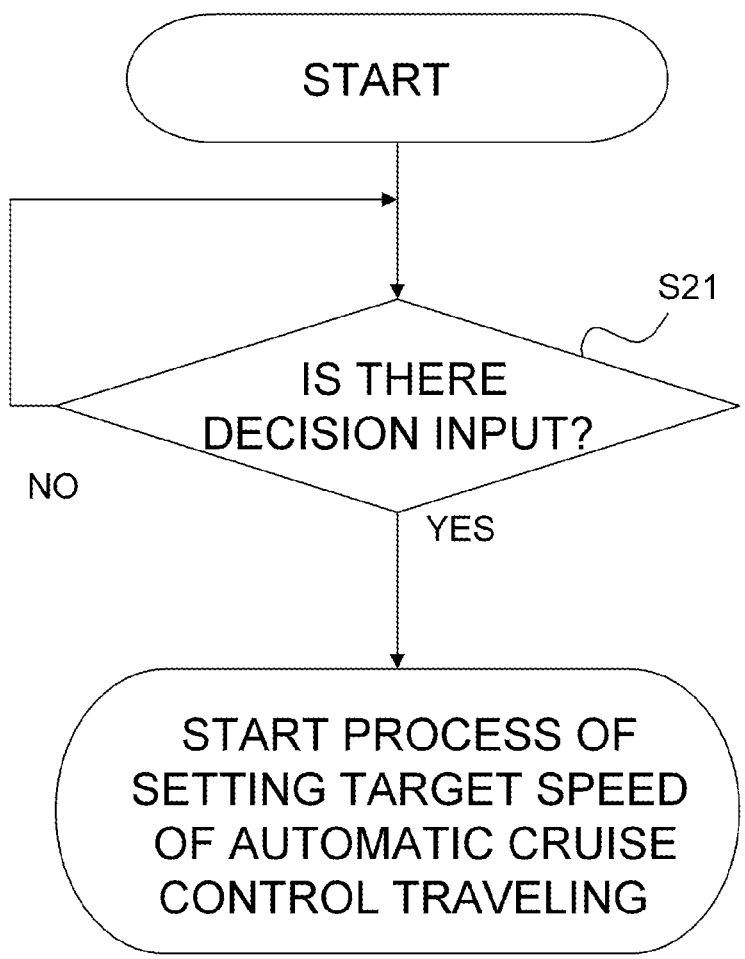
FIG. 2 is a flow chart which represents a processing routine when a traveling mode is changed to an automatic cruise control traveling.

FIG. 2 shows a processing routine when a traveling mode is changed to an automatic cruise control traveling from a normal traveling with a flow chart.

At first, a driver turns on the ignition switch. The microcomputer 101 to which the DC voltage (Vcc) is supplied waits for an operation of requiring the transition from a normal traveling to an automatic cruise control traveling (Step S21). In particular, in Step S21, the microcomputer 101 determines whether the deciding switch 106(a) is pressed. When it is determined that the deciding switch 106(a) is not pressed (ON) as a result of the determination, the process of Step S21 is repeated again. On the other hand, when it is determined that the deciding switch 106(a) is pressed in the determination of Step S21, a process of setting a target speed for the automatic cruise control traveling is started.

If safety is considered more, it is preferred that the microcomputer 101 determines the operation situation of the vehicle based on the current vehicle speed, and only when it is determined that the vehicle is stopped as a result of the determination, the process of setting the target speed is started.

Figure 3:
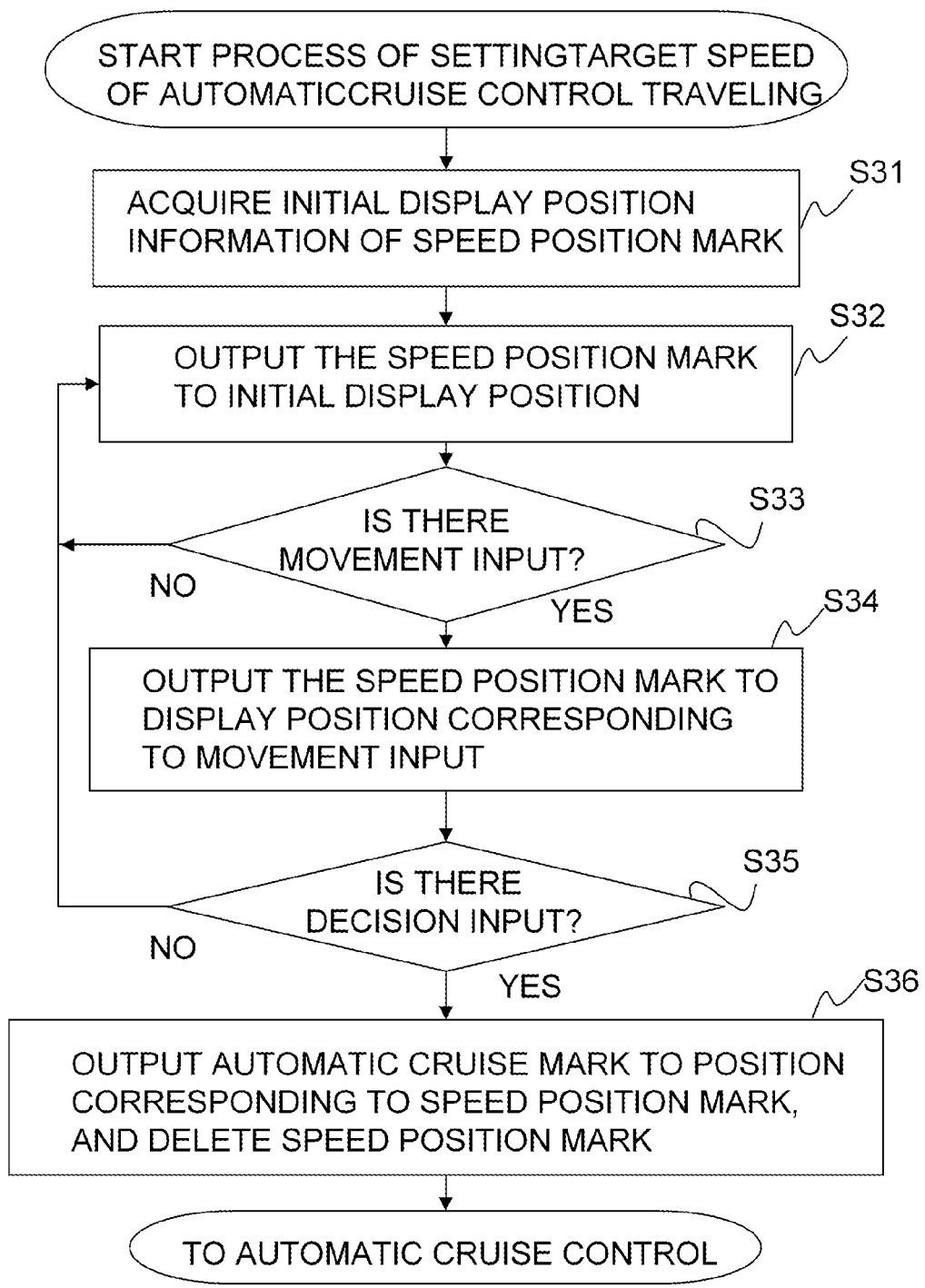
FIG. 3 is a flow chart which represents a processing routine when a target speed of the automatic cruise control traveling is set.

FIG. 3 shows a processing routine when a target speed of the automatic cruise control is set with a flow chart.

In Step S31, the microcomputer 101 acquires the information about a position (initial display position) displaying the speed position mark 42 just after the process of setting the target speed starts with reference to the read only memory 102. For example, the initial display position can be a position indicating the target speed that was set when the automatic cruise control traveling was performed last time. Besides this position, the initial display position may be a position where the speed position mark 42 indicates 0 km/h on the speed scale 41, or a position indicating the vehicle speed if it is determined that the deciding switch 106(a) is pressed in Step S21 when the vehicle is traveling at the time of the process of Step S31 of FIG. 3.

In Step S32, as shown in FIG. 4A, the microcomputer 101 outputs the speed position mark 42 at the initial display position of the liquid crystal display 113 acquired in Step S31. At the same time, the numeric display 44 is output to the inside of the speed position mark 42. In the present example, the target speed when the automatic cruise control traveling was performed last time was 52 km/h. As shown in FIG. 4A, the speed position mark 42 is largely output to overlap with the speed scale 41 at the inner side the speed scale 41.

In Step S33, the microcomputer 101 determines whether the plus switch 106(b) or the minus switch 106(c) is pressed. As a result of the determination, when it is determined that none of the plus switch 106(b) and the minus switch 106(c) is pressed, in other words, when it is determined that a movement input which requires the speed position mark 42 to be moved on the speed scale 41 is not received, the flow returns to Step S33 and the process of the step is repeated.

In the determination of Step S33, when it is determined that the plus switch 106(b) is pressed, that is, when it is determined that a movement input which requires the speed position mark 42 to be moved on the speed scale 41 is received, the flow advances to Step S34. In this case, in Step S34, the microcomputer 101 only adds a predetermined quantity (for example, 1 km/h) to the speed that the speed position mark 42 should indicate, and as shown with an arrow in FIG. 4A, the position to which the speed position mark 42 is moved for the quantity is output. Further, the microcomputer 101 only adds the quantity to the speed that the numeric display 44 displays, and makes the numeric display 44 to be output to the inside of the speed position mark 42 which is output to the moved position.

On the other hand, in the determination of Step S33, when it is determined that the minus switch 106(c) is pressed, that is, when it is determined that a movement input which requires the speed position mark 42 to be moved on the speed scale 41 is received, the flow advances to Step S34 similarly. In this case, in Step S34, the microcomputer 101 only subtracts a predetermined quantity (for example, 1 km/h) from the speed that the speed position mark 42 should indicate, and as shown with an arrow in FIG. 4A, the position to which the speed position mark 42 is moved for the quantity is output. Further, the microcomputer 101 only subtracts the quantity from the speed that the numeric display 44 displays, and makes the numeric display 44 to be output to the inside of the speed position mark 42 which is output to the moved position.

That is, with a series of processes in Step S33 and Step S34, the microcomputer 101 outputs the speed position mark 42 and the numeric display 44 to the position corresponding to a signal received as the movement input from the plus switch 106(b) or the minus switch 106(c).

If safety is considered more, it is preferred that the microcomputer 101 determines the operation situation of the vehicle based on the current vehicle speed, and only when it is determined that the vehicle is stopped as a result of the determination, the movement input is received.

In Step S35, the microcomputer 101 determines whether the deciding switch 106(a) is pressed. As a result of the determination, when it is determined that the deciding switch 106(a) is not pressed, that is, when it is determined that a decision input which gives an order of deciding the target speed is not received, the flow returns to Step S33 and the processes of those steps after the step are repeated.

In the determination of Step S35, when it is determined that the deciding switch 106(a) is pressed, that is, when it is determined that a decision input which gives an order of deciding the target speed is received, the flow advances to Step S36. In Step S36, as shown in FIG. 4B, the microcomputer 101 stops the output of the speed position mark 42 and the numeric display 44, and outputs the automatic cruise mark 43 at a position indicating the same speed as the speed that the speed position mark 42 indicates when the deciding switch 106(a) is pressed. As shown in FIG. 4B, the automatic cruise mark 43 is output to a position in the speed scale 41 at the outer side of the position where the speed position mark 42 was output. Further, as shown in FIG. 4B, the automatic cruise mark 43 is output to be smaller than the speed position mark 42.

Further, in Step S36, the microcomputer 101 makes the read only memory 102 store the position where the speed position mark 42 is output as an initial display position.

After the process of Step S36 is finished, the automatic cruise control traveling is started. At the time of the automatic cruise control traveling, as shown in FIG. 4C, the microcomputer 101 only outputs the automatic cruise mark 43.

As described above, in the above embodiment, in the case of setting the target speed, the microcomputer 101 outputs one of the speed position mark 42 and the automatic cruise mark 43 as information to the liquid crystal display 113. After the process of setting the target speed is started, the speed position mark 42 is output to the position corresponding to the received movement input. After the decision input is received, the automatic cruise mark 43 distinguishable from the speed position mark 42 is output instead of the speed position mark 42.

Therefore, the speed information output to the liquid crystal display 113 at the same time is limited to one kind. As a result, in the case of setting the target speed, the burden required for the driver that performs the setting to recognize the information can be reduced.

In the above embodiment, as shown in FIGS. 4A to 4C, the region where the speed position mark 42 is output is different from the region where the automatic cruise mark 43 is output.

Thereby, the automatic cruise mark 43 is distinguished from the speed position mark 42 easily. As a result, the burden required for the driver to determine whether the target speed is being set, or the target has been set can be reduced.

In the above embodiment, as shown in FIGS. 4A to 4C, the appearance of the output speed position mark 42 is bigger than the appearance of the automatic cruise mark 43. That is, the speed position mark 42 is displayed by being emphasized over the automatic cruise mark 43.

Thereby, the information shown by the speed position mark 42 is recognized more easily than the information displayed by the automatic cruise mark 43.

As a result, the burden required for the driver to recognize the target speed which is being set can be reduced.

Furthermore, at the time of the automatic cruise traveling, the appearance of the automatic cruise mark 43 is output to be small.

Thereby, the visibility of the pointer 45 and the speed scale 41 becomes higher than that at the time of setting the target speed. As a result, the burden required for the driver to recognize the current vehicle speed at the time of the automatic cruise traveling can be reduced.

In the above embodiment, as shown in FIG. 4A, the speed information that the speed position mark 42 indicates is displayed as digital information by the numeric display 44.

Thereby, the target speed which is being set is recognized easily. As a result, the burden required for the driver to recognize the information related to the target speed which is being set can be reduced.

The technical scope of the present disclosure is not limited to the above described embodiment. The above described embodiment can be accompanied by various kinds of modifications or improvements in the technical scope of the present disclosure.

For example, in the above embodiment, it is described that the speed position mark 42 and the automatic cruise mark 43 are output to be distinguishable by different display positions and display regions, but the invention is not limited to this. It is possible that the speed position mark 42 and the automatic cruise mark 43 are output to be distinguishable by different shapes, designs, colors or the like.

In the above embodiment, it is described that the numeric display 44 is displayed inside the speed position mark 42, but the invention is not limited to this. The numeric display 44 may be displayed near the speed position mark 42.

By the configuration described in the above, an image displaying speedometer which can reduce the burden required in the case of setting a target speed for a driver who performs the setting to recognize information can be provided.

What is claimed is:

1. An image displaying speedometer comprising:
    an input device configured to receive a movement input and a decision input; and
    a display configured to output information including a speed scale, a first indicator configured to identify a part of the speed scale and a second indicator configured to indicate a part of the speed scale as information, the first indicator being different from the second indicator;
    a processor; and
    memory storing computer readable instructions that, when executed, cause the image displaying speedometer to:
        receive speed setting movement input through the input device;
        display the first indicator in a position identifying the part of the speed scale corresponding to a speed specified by the speed setting movement input received through the input device,
        receive a decision input through the input device, the decision input indicating a selection of a speed; and
        output the second indicator, instead of the first indicator, indicating the same part of the speed scale which has been indicated by the first indicator after the input device receives the decision input, wherein outputting the second indicator includes removing the first indicator from the display.

2. The image displaying speedometer according to claim 1, wherein the position where the display outputs the first indicator before the input device receives the decision input is different from a position where the display outputs the second indicator after the input device receives the decision input.

3. The image displaying speedometer according to claims 1, wherein the first indicator is larger than the second indicator.

4. The image displaying speedometer according to claim 1, wherein first indicator includes a numerical speed and wherein the first indicator moves upon receiving further speed setting input through the input device.

5. The image displaying speedometer according to claim 1, wherein after the decision input is received and before a subsequent speed setting input is received, the first indicator is not displayed.

6. The image displaying speedometer according to claim 1, wherein the first indicator and the second indicator differ in at least one of size and shape.

\* \* \* \* \*